(12) United States Patent
Pelliconi et al.

(10) Patent No.: US 7,700,690 B2
(45) Date of Patent: *Apr. 20, 2010

(54) IMPACT-RESISTANT POLYOLEFIN COMPOSITIONS

(75) Inventors: Anteo Pelliconi, Rovigo (IT); Antonella Angelini, Ferrara (IT); Paola Sgarzi, Ferrara (IT)

(73) Assignee: Basell Poliolefine Italia s.r.l., Milan (IT)

( * ) Notice: Subject to any disclaimer, the term of this patent is extended or adjusted under 35 U.S.C. 154(b) by 184 days.

This patent is subject to a terminal disclaimer.

(21) Appl. No.: 10/518,882

(22) PCT Filed: Jun. 11, 2003

(86) PCT No.: PCT/EP03/06097

§ 371 (c)(1),
(2), (4) Date: Jun. 8, 2005

(87) PCT Pub. No.: WO2004/003073

PCT Pub. Date: Jan. 8, 2004

(65) Prior Publication Data

US 2005/0272874 A1  Dec. 8, 2005

(30) Foreign Application Priority Data

Jun. 26, 2002 (EP) ................... 02014214

(51) Int. Cl.
C08L 23/00 (2006.01)
C08L 23/04 (2006.01)
(52) U.S. Cl. ...................... 525/191; 525/240
(58) Field of Classification Search ................ 525/191, 525/240
See application file for complete search history.

(56) References Cited

U.S. PATENT DOCUMENTS

| | | | |
|---|---|---|---|
| 3,515,775 A | 6/1970 | Combs et al. | |
| 4,128,606 A | 12/1978 | Furutachi et al. | |
| 4,143,099 A | 3/1979 | Duncan | |
| 4,220,579 A | 9/1980 | Rinehart | |
| 4,298,718 A | 11/1981 | Mayr et al. | |
| 4,313,867 A | 2/1982 | Duvdevani | |
| 4,316,966 A | 2/1982 | Mineshima et al. | |
| 4,399,054 A | 8/1983 | Ferraris et al. | |
| 4,480,065 A | 10/1984 | Kawai et al. | |
| 4,495,338 A | 1/1985 | Mayr et al. | |
| 4,705,818 A | 11/1987 | Kawai et al. | |
| 4,734,459 A | 3/1988 | Cecchin et al. | 525/247 |
| 4,857,613 A | 8/1989 | Zolk et al. | |
| 4,871,796 A | 10/1989 | Komatsu et al. | |
| 5,055,528 A | 10/1991 | Kioka et al. | |
| 5,115,030 A | 5/1992 | Tanaka et al. | |
| 5,145,819 A | 9/1992 | Winter et al. | 502/117 |
| 5,155,030 A | 10/1992 | Nakamura et al. | |
| 5,239,022 A | 8/1993 | Winter et al. | |
| 5,243,001 A | 9/1993 | Winter et al. | |
| 5,288,824 A | 2/1994 | Kerth et al. | |
| 5,324,800 A | 6/1994 | Welborn, Jr. et al. | 526/160 |
| 5,480,972 A | 1/1996 | Avjioglu et al. | |
| 5,536,789 A | 7/1996 | Schwager et al. | |
| 5,541,260 A | 7/1996 | Pelliconi et al. | 525/240 |
| 5,556,918 A | 9/1996 | Brodt et al. | |
| 5,747,592 A | 5/1998 | Huff et al. | |
| 5,763,534 A | 6/1998 | Srinivasan et al. | |
| 5,824,400 A | 10/1998 | Petrakis et al. | |
| 6,051,728 A | 4/2000 | Resconi et al. | |
| 6,054,406 A | 4/2000 | Smith | |
| 6,191,223 B1 | 2/2001 | Dolle et al. | |
| 6,214,934 B1 * | 4/2001 | Moriya et al. | 525/89 |
| 6,395,832 B1 | 5/2002 | Pelliconi et al. | |
| 6,429,250 B1 | 8/2002 | Rohrmann | |
| 6,444,833 B1 | 9/2002 | Ewen et al. | |
| 6,451,724 B1 | 9/2002 | Nifant'ev et al. | |
| 6,518,386 B1 | 2/2003 | Resconi et al. | |

(Continued)

FOREIGN PATENT DOCUMENTS

DE    3319619    11/1983

(Continued)

OTHER PUBLICATIONS

J. Wolters, "Polyolefin-Elastomere; Moderne Katalysatoretchnik steht Pate fur Thermoplaste mit Kautscuk-Eigenschaften," *Kuntstoffe*, vol. 84, p. 446-450 (1994).

(Continued)

*Primary Examiner*—Nathan M Nutter
(74) *Attorney, Agent, or Firm*—Jarrod N. Raphael

(57) ABSTRACT

Polyolefin compositions comprising (percent by weight): 1) 55-80% of a crystalline propylene homopolymer or copolymer containing up to 15% of ethylene and/or $C_4$-$C_{10}$ α-olefin(s) and having an MFR value of at least 15 g/10 min, and 2) 2) 20-45 wt % of a copolymer of ethylene with one or more $C_4$-$C_{10}$ α-olefin(s) containing from 10 to 4 wt % of said $C_4$-$C_{10}$ α-olefin(s). The said compositions have values of MFR equal to or higher than 15 g/10 min, a total content of ethylene of 20% or more, a total content of $C_4$-$C_{10}$ α-olefin(s) of 4.5% or more, a ratio of the total content of ethylene to the total content of $C_4$-$C_{10}$ α-olefin(s) of 2.3 or more, and an intrinsic viscosity value of the fraction soluble in xylene at room temperature of 1.7 dl/g or less.

11 Claims, No Drawings

U.S. PATENT DOCUMENTS

| | | |
|---|---|---|
| 6,559,252 B1 | 5/2003 | Horton et al. |
| 6,608,224 B2 | 8/2003 | Resconi et al. |
| 6,635,779 B1 | 10/2003 | Ewen et al. |
| 6,696,520 B1 | 2/2004 | Pellegatti et al. |
| 6,841,501 B2 | 1/2005 | Resconi et al. |
| 6,878,786 B2 | 4/2005 | Resconi et al. |
| 6,953,829 B2 | 10/2005 | Kratzer et al. |
| 7,101,940 B2 | 9/2006 | Schottek et al. |
| 7,112,638 B2 | 9/2006 | Nifant'ev et al. |
| 7,141,527 B1 | 11/2006 | Van Baar et al. |
| 7,141,637 B2 | 11/2006 | Elder et al. |
| 7,238,818 B2 | 7/2007 | Ewen et al. |
| 2003/0008984 A1 | 1/2003 | Kratzer et al. |
| 2003/0013913 A1 | 1/2003 | Schottek et al. |
| 2004/0010087 A1 | 1/2004 | Obata et al. |
| 2006/0041072 A1* | 2/2006 | Pelliconi et al. ............ 525/240 |
| 2006/0047071 A1* | 3/2006 | Pelliconi et al. ............ 525/191 |
| 2006/0235139 A1 | 10/2006 | Garagnani et al. |
| 2007/0078224 A1* | 4/2007 | Dominic et al. ............ 525/240 |

FOREIGN PATENT DOCUMENTS

| | | |
|---|---|---|
| DE | 4019053 | 12/1991 |
| DE | 4211413 | 10/1993 |
| DE | 19962814 | 6/2001 |
| DE | 19962910 | 7/2001 |
| EP | 9276 | 4/1980 |
| EP | 45975 | 2/1982 |
| EP | 0045977 | 2/1982 |
| EP | 86473 | 8/1983 |
| EP | 0129368 | 12/1984 |
| EP | 0170255 | 2/1986 |
| EP | 353981 | 2/1990 |
| EP | 0361493 | 4/1990 |
| EP | 361494 | 4/1990 |
| EP | 362705 | 4/1990 |
| EP | 0373660 | 6/1990 |
| EP | 395083 | 10/1990 |
| EP | 0416815 | 3/1991 |
| EP | 0420436 | 4/1991 |
| EP | 430490 | 6/1991 |
| EP | 451645 | 10/1991 |
| EP | 457082 | 11/1991 |
| EP | 463406 | 1/1992 |
| EP | 472946 | 3/1992 |
| EP | 476625 | 3/1992 |
| EP | 485820 | 5/1992 |
| EP | 485822 | 5/1992 |
| EP | 485823 | 5/1992 |
| EP | 496926 | 8/1992 |
| EP | 519725 | 12/1992 |
| EP | 553805 | 8/1993 |
| EP | 553806 | 8/1993 |
| EP | 323715 | 9/1993 |
| EP | 573862 | 12/1993 |
| EP | 600246 | 6/1994 |
| EP | 602512 | 6/1994 |
| EP | 611801 | 8/1994 |
| EP | 633289 | 1/1995 |
| EP | 0643066 | 3/1995 |
| EP | 0671404 | 9/1995 |
| EP | 0674991 | 10/1995 |
| EP | 692499 | 1/1996 |
| EP | 0728769 | 8/1996 |
| EP | 782587 | 7/1997 |
| EP | 790076 | 8/1997 |
| EP | 792814 | 9/1997 |
| EP | 816395 | 1/1998 |
| EP | 831125 | 3/1998 |
| EP | 844279 | 5/1998 |
| EP | 844280 | 5/1998 |
| EP | 844281 | 5/1998 |
| EP | 936247 | 8/1999 |
| EP | 936248 | 8/1999 |
| EP | 1236769 | 9/2002 |
| JP | 01016848 | 1/1989 |
| WO | 91/02012 | 2/1991 |
| WO | 9104257 | 4/1991 |
| WO | 92/00333 | 1/1992 |
| WO | 92/22607 | 12/1992 |
| WO | 96/22327 | 7/1996 |
| WO | 96/22995 | 8/1996 |
| WO | 98/22486 | 5/1998 |
| WO | 98/37144 | 8/1998 |
| WO | 99/21899 | 5/1999 |
| WO | 99/24446 | 5/1999 |
| WO | 99/58539 | 11/1999 |
| WO | 00/26295 | 5/2000 |
| WO | 01/19915 | 3/2001 |
| WO | 01/21674 | 3/2001 |
| WO | 01/44318 | 6/2001 |
| WO | 01/47939 | 7/2001 |
| WO | 01/62764 | 8/2001 |
| WO | 03/045964 | 6/2003 |
| WO | 03/051984 | 6/2003 |
| WO | 2004/003072 | 1/2004 |
| WO | 2005/014715 | 2/2005 |
| WO | 2005/044911 | 5/2005 |
| WO | 2005/121240 | 12/2005 |

OTHER PUBLICATIONS

M. Kakugo et al., "$^{13}$C NMR Determination of Monomer Sequence Distribution in Ethylene-Propylene Copolymers Prepared with $\delta$-TiCl$_3$-Al(C$_2$H$_5$)$_2$Cl," *Macromolecules*, vol. 15(4), p. 1150-1152 (1982).

J. Randall, "A Review of High Resolution Liquid $^{13}$Carbon Nuclear Magnetic Resonance Characterizations of Ethylene-Based Polymers," *JMS-Rev. Macromol. Chem. Phys.*, C29(2&3), p. 201-317 (1989).

J. Randall, "3.4 Monomer Distributions and Number-Average Sequence Lengths in Ethylene-Propylene Copolymers," *Polymer Sequence Determination; Carbon-13 NMR Method*, p. 53-58 (1977).

\* cited by examiner

IMPACT-RESISTANT POLYOLEFIN COMPOSITIONS

This application is the U.S. national phase of International Application PCT/EP2003/006097, filed Jun. 11, 2003.

The present invention concerns polyolefin compositions comprising a crystalline propylene polymer component selected from propylene-ethylene and/or other α-olefin random copolymers, and a copolymer of ethylene with $C_4$-$C_{10}$ α-olefins.

The compositions of the present invention can be easily converted into various kinds of finished or semi-finished articles, in particular by using injection-molding techniques, as they exhibit relatively high values of melt flow rate (MFR). In addition, as they show substantially no stress whitening when bending a 1 mm thick plaque, the said compositions can be used for several applications, including toys and housewares, in particular for those articles that need with impact resistance at low temperatures without failure of the articles. The said articles can advantageously be used in the food-contact applications, examples of which are food containers suitable for freezers.

Compositions comprising polypropylene and a rubbery phase formed by an elastomeric copolymer of ethylene with α-olefins are already known in the art, and described in particular in European patents 170 255 and 373 660, and in WO 01/19915. Said compositions exhibit impact resistance and, in the case of European patent 373 660 and WO 01/19915, transparency values interesting for many applications, however the overall balance of properties is still not totally satisfactory in the whole range of possible applications, in view of the high standards required by the market. Therefore there is a continuous demand for compositions of this kind with improved properties.

A new and valuable balance of properties has now been achieved by the polyolefin compositions of the present invention, comprising (percent by weight):

1) 55-80% of a crystalline propylene homopolymer or copolymer containing up to 15% of ethylene and/or $C_4$-$C_{10}$ α-olefin(s) and having an MFR value of at least 15 g/10 min; and
2) 20-45% of a copolymer of ethylene with one or more $C_4$-$C_{10}$ α-olefin(s) containing from 10 to 40% of said $C_4$-$C_{10}$ α-olefin(s);

said compositions having values of MFR (230° C., 2.16 kg) equal to or higher than 15 g/10 min, a total content of ethylene of 20% or more, a total content of $C_4$-$C_{10}$ α-olefin(s) of 4.5% or more, a ratio of the total content of ethylene to the total content of $C_4$-$C_{10}$ α-olefin(s) of 2.3 or more, and an intrinsic viscosity value of the fraction soluble in xylene at room temperature of 1.7 dl/g or less, preferably of 1.5 dl/g or less.

From the above definitions it is evident that the term "copolymer" includes polymers containing more than one kind of comonomers.

The compositions of the present invention provide in particular a combination of very high flowability and high impact resistance (in terms of ductile/brittle transition temperature and Izod impact resistance) and high transparency.

The preferred polyolefin compositions are flexible polyolefin compositions comprising (percent by weight):

1) 55-75%, preferably 55-70%, of a crystalline propylene homopolymer or copolymer containing up to 15% of ethylene and/or $C_4$-$C_{10}$ α-olefin(s) and having a MFR from 15 to 80 g/10 min; and
2) 25-45%, preferably 30-45%, of a copolymer of ethylene with one or more $C_4$-$C_{10}$ α-olefin(s) containing from 15 to 40% of said $C_4$-$C_{10}$ α-olefin(s);

said compositions having values of MFR (230° C., 2.16 kg) equal to or higher than 15 g/10 min, a total content of ethylene of 20% or more, a total content of $C_4$-$C_{10}$ α-olefin(s) of 6% or more, a ratio of the total content of ethylene to the total content of $C_4$-$C_{10}$ α-olefin(s) of 2.3 or more, a total fraction soluble in xylene at room temperature of 18 wt % or higher, preferably at least 20 wt %, and an intrinsic viscosity value of the fraction soluble in xylene at room temperature of 1.7 dl/g or less, preferably of 1.5 dl/g or less.

The compositions of the present invention have preferably a MFR value from 15 g/10 to 40 g/10 min.

Particularly preferred features for the compositions of the present invention are:

content of fraction insoluble in xylene at room temperature (23° C.) (substantially equivalent to the Isotacticity Index) for component 1): not less than 90%, in particular not less than 93%, said percentages being by weight and referred to the weight of component 1);

a total content of ethylene from 20% to 40% by weight;

a total content of $C_4$-$C_{10}$ α-olefin(s) from 6% to 15% by weight;

a flexural modulus value less than 770 MPa, but preferably higher than 600 MPa, more preferably higher than 650 MPa;

fraction soluble in xylene at room temperature: less than 35%, more preferably less than 30% by weight;

intrinsic viscosity of the fraction soluble in xylene at room temperature in the range from 0.8 to 1.5 dl/g.

The ductile/brittle transition temperature is generally equal to or lower than 35° C., the lower limit being indicatively of about 60° C.

The said $C_4$-$C_{10}$ α-olefins, which are or may be present as comonomers in the components and fractions of the compositions of the present invention, are represented by the formula $CH_2$=CHR, wherein R is an alkyl radical, linear or branched, with 2-8 carbon atoms or an aryl (in particular phenyl) radical.

Examples of said $C_4$-$C_{10}$ α-olefins are 1-butene, 1-pentene, 1-hexene, 4-methyl-1-pentene and 1-octene. Particularly preferred is 1-butene.

The compositions of the present invention can be prepared by a sequential polymerization, comprising at least two sequential steps, wherein components 1) and 2) are prepared in separate subsequent steps, operating in each step, except the first step, in the presence of the polymer formed and the catalyst used in the preceding step. The catalyst is added only in the first step, however its activity is such that it is still active for all the subsequent steps.

Preferably component 1) is prepared before component 2).

The polymerization, which can be continuous or batch, is carried out following known techniques and operating in liquid phase, in the presence or not of inert diluent, or in gas phase, or by mixed liquid-gas techniques. Preferably both components 1) and 2) are prepared in gas phase.

Reaction time, pressure and temperature relative to the two steps are not critical, however it is best if the temperature is from 20 to 100° C. The pressure can be atmospheric or higher.

The regulation of the molecular weight is carried out by using known regulators, hydrogen in particular.

Such polymerization is preferably carried out in the presence of stereospecific Ziegler-Natta catalysts. An essential component of said catalysts is a solid catalyst component comprising a titanium compound having at least one titanium-halogen bond, and an electron-donor compound, both supported on a magnesium halide in active form. Another essential component (co-catalyst) is an organoaluminum compound, such as an aluminum alkyl compound.

An external donor is optionally added.

The catalysts generally used in the process of the invention are capable of producing polypropylene with an isotactic index greater than 90%, preferably greater than 95%. Catalysts having the above mentioned characteristics are well known in the patent literature; particularly advantageous are the catalysts described in U.S. Pat. No. 4,399,054 and European patent 45977.

The solid catalyst components used in said catalysts comprise, as electron-donors (internal donors), compounds selected from the group consisting of ethers, ketones, lactones, compounds containing N, P and/or S atoms, and esters of mono- and dicarboxylic acids.

Particularly suitable electron-donor compounds are phthalic acid esters, such as diisobutyl, dioctyl, diphenyl and benzylbutyl phthalate.

Other electron-donors particularly suitable are 1,3-diethers of formula:

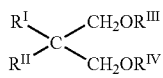

wherein $R^I$ and $R^{II}$ are the same or different and are $C_1$-$C_{18}$ alkyl, $C_3$-$C_{18}$ cycloalkyl or $C_7$-$C_{18}$ aryl radicals; $R^{III}$ and $R^{IV}$ are the same or different and are $C_1$-$C_4$ alkyl radicals; or are the 1,3-diethers in which the carbon atom in position 2 belongs to a cyclic or polycyclic structure made up of 5, 6 or 7 carbon atoms and containing two or three unsaturations.

Ethers of this type are described in published European patent applications 361493 and 728769.

Representative examples of said dieters are 2-methyl-2-isopropyl-1,3-dimethoxypropane, 2,2-diisobutyl-1,3-dimethoxypropane, 2-isopropyl-2-cyclopentyl-1,3-dimethoxypropane, 2-isopropyl-2-isoamyl-1,3-dimethoxypropane, 9,9-bis (methoxymethyl) fluorene.

The preparation of the above mentioned catalyst components is carried out according to various methods.

For example, a $MgCl_2 \cdot nROH$ adduct (in particular in the form of spheroidal particles) wherein n is generally from 1 to 3 and ROH is ethanol, butanol or isobutanol, is reacted with an excess of $TiCl_4$ containing the electron-donor compound. The reaction temperature is generally from 80 to 120° C. The solid is then isolated and reacted once more with $TiCl_4$, in the presence or absence of the electron-donor compound, after which it is separated and washed with aliquots of a hydrocarbon until all chlorine ions have disappeared.

In the solid catalyst component the titanium compound, expressed as Ti, is generally present in an amount from 0.5 to 10% by weight. The quantity of electron-donor compound which remains fixed on the solid catalyst component generally is 5 to 20% by moles with respect to the magnesium dihalide.

The titanium compounds which can be used for the preparation of the solid catalyst component are the halides and the halogen alcoholates of titanium. Titanium tetrachloride is the preferred compound.

The reactions described above result in the formation of a magnesium halide in active form. Other reactions are known in the literature, which cause the formation of magnesium halide in active form starting from magnesium compounds other than halides, such as magnesium carboxylates.

The Al-alkyl compounds used as co-catalysts comprise the Al-trialkyls, such as Al-triethyl, Al-triisobutyl, Al-tri-n-butyl, and linear or cyclic Al-alkyl compounds containing two or more Al atoms bonded to each other by way of O or N atoms, or $SO_4$ or $SO_3$ groups. The Al-alkyl compound is generally used in such a quantity that the Al/Ti ratio be from 1 to 1000.

The electron-donor compounds that can be used as external donors include aromatic acid esters such as alkyl benzoates, and in particular silicon compounds containing at least one Si—OR bond, where R is a hydrocarbon radical. Examples of silicon compounds are $(tert-butyl)_2Si(OCH_3)_2$, $(cyclohexyl)(methyl)Si(OCH_3)_2$, $(phenyl)_2Si(OCH_3)_2$ and $(cyclopentyl)_2Si(OCH_3)_2$. 1,3-diethers having the formulae described above can also be used advantageously. If the internal donor is one of these dieters, the external donors can be omitted.

The catalysts can be pre-contacted with small amounts of olefins (prepolymerization).

Other catalysts that may be used in the process according to the present invention are metallocene-type catalysts, as described in U.S. Pat. No. 5,324,800 and EP-A-0 129 368; particularly advantageous are bridged bis-indenyl metallocenes, for instance as described in U.S. Pat. No. 5,145,819 and EP-A-0 485 823. Another class of suitable catalysts are the so-called constrained geometry catalysts, as described in EP-A-0 416 815 (Dow), EP-A-0 420 436 (Exxon), EP-A-0 671 404, EP-A-0 643 066 and WO 91/04257. These metallocene compounds may be used in particular to produce the copolymers (a) and (b).

The compositions of the present invention can also be obtained by preparing separately the said components 1) and 2), by operating with the same catalysts and substantially under the same polymerization conditions as previously explained (except that a wholly sequential polymerization process will not be carried out, but the said components will be prepared in separate polymerization steps) and then mechanically blending said components in the molten or softened state. Conventional mixing apparatuses, like screw extrudres, in particular twin screw extruders, can be used.

The compositions of the present invention can also contain additives commonly employed in the art, such as antioxidants, light stabilizers, heat stabilizers, nucleating agents, colorants and fillers.

In particular, the addition of nucleating agents brings about a considerable improvement in important physical-mechanical properties, such as flexural modulus, Heat Distortion Temperature (HDT), tensile strength at yield and transparency.

Typical examples of nucleating agents are the p-tert-butyl benzoate and the 1,3- and 2,4-dibenzylidenesorbitols.

The nucleating agents are preferably added to the compositions of the present invention in quantities ranging from 0.05 to 2% by weight, more preferably from 0.1 to 1% by weight with respect to the total weight.

The addition of inorganic fillers, such as talc, calcium carbonate and mineral fibers, also brings about an improvement to some mechanical properties, such as flexural modulus and HDT. Talc can also have a nucleating effect.

The particulars are given in the following examples, which are given to illustrate, without limiting, the present invention.

EXAMPLES 1-3

In the following examples polyolefin compositions according to the present invention are prepared by sequential polymerization.

The solid catalyst component used in polymerization is a highly stereospecific Ziegler-Natta catalyst component supported on magnesium chloride, containing about 2.5% by weight of titanium and diisobutylphthalate as internal donor, prepared by analogy with the method described in Example 1 of European published patent application 674991.

Catalyst System and Prepolymerization Treatment

Before introducing it into the polymerization reactors, the solid catalyst component described above is contacted at −5° C. for 5 minutes with aluminum triethyl (TEAL) and dicyclopentyldimethoxysilane (DCPMS), in a TEAL/DCPMS weight ratio equal to about 4 and in such quantity that the TEAL/Ti molar ratio be equal to 65.

The catalyst system is then subjected to prepolymerization by maintaining it in suspension in liquid propylene at 20° C. for about 20 minutes before introducing it into the first polymerization reactor.

Polymerization

The polymerization is carried out in continuous in a series of two gas phase reactors equipped with devices for the transfer of the product coming from the reactor immediately preceding to the one immediately following.

In gas phase the hydrogen and the monomer(s) are analyzed in continuous and fed in such a manner that the desired concentration be maintained constant.

Into a first gas phase polymerization reactor a propylene/ethylene copolymer is produced by feeding in a continuous and constant flow the prepolymerized catalyst system, hydrogen (used as molecular weight regulator) and propylene and ethylene monomers in the gas state, thus obtaining component 1).

The polymer produced in the first reactor is discharged in the second reactor where an ethylene/butene copolymer is produced by feeding the monomer(s) and hydrogen in proper molar ratios, thus obtaining component 2).

Then the polymer particles are introduced in a rotating drum, where they are mixed with 0.05% by weight of paraffinic oil, 0.05% by weight of sodium stearate, 0.15% by weight of Irganox® B215 (1 weight part of pentaerithryl-tetrakis[3(3,5-di-tert-butyl-4-hydroxyphenyl] mixed with 1 weight part of tris(2,4-ditert-butylphenyl) phosphite) and 0.2% by weight of Millad® 3988 3,4-dimethylbenzylidene sorbitol.

Then the polymer particles are introduced in a twin screw extruder Berstorff™ ZE 25 (length/diameter ratio of screws: 33) and extruded under nitrogen atmosphere in the following conditions:

Rotation speed: 250 rpm;
Extruder output: 6-20 kg/hour;
Melt temperature: 200-250° C.

The data relating to the final polymer compositions reported in table 1 and 2 are obtained from measurements carried out on the so extruded polymers.

The data shown in the tables are obtained by using the following test methods.

Molar Ratios of the Feed Gases

Determined by gas-chromatography.

Ethylene and 1-butene Content of the Polymers

Determined by I.R. spectroscopy

Melt Flow Rate (MFR)

Determined according to ASTM D 1238, condition L (MFR"L").

Xylene Soluble and Insoluble Fractions

Determined as follows.

2.5 g of polymer and 250 ml of xylene are introduced in a glass flask equipped with a refrigerator and a magnetical stirrer. The temperature is raised in 30 minutes up to the boiling point of the solvent. The so obtained clear solution is then kept under reflux and stirring for further 30 minutes. The closed flask is then kept for 30 minutes in a bath of ice and water and in thermostatic water bath at 25° C. for 30 minutes as well. The so formed solid is filtered on quick filtering paper. 100 ml of the filtered liquid is poured in a previously weighed aluminum container which is heated on a heating plate under nitrogen flow, to remove the solvent by evaporation. The container is then kept in an oven at 80° C. under vacuum until constant weight is obtained. The weight percentage of polymer soluble in xylene at room temperature is then calculated. The percent by weight of polymer insoluble in xylene at room temperature is considered the Isotacticity Index of the polymer. This value corresponds substantially to the Isotacticity Index determined by extraction with boiling n-heptane, which by definition constitutes the Isotacticity Index of polypropylene.

Intrinsic Viscosity (I.V.)

Determined in tetrahydronaphthalene at 135° C.

Flexural Modulus

Determined according to ISO 178.

Ductile/Brittle Transition Temperature (D/B)

Determined according to internal method MA 17324, available upon request. According to this method, the bi-axial impact resistance is determined through impact with an automatic, computerised striking hammer. The circular test specimens are obtained by cutting with circular hand punch (38 mm diameter). They are conditioned for at least 12 hours at 23° C. and 50 RH and then placed in a thermostatic bath at testing temperature for 1 hour.

The force-time curve is detected during impact of a striking hammer (5.3 kg, hemispheric punch with a 1.27 cm diameter) on a circular specimen resting on a ring support. The machine used is a CEAST 6758/000 type model No. 2.

D/B transition temperature means the temperature at which 50% of the samples undergoes fragile break when submitted to the said impact test.

Preparation of the Plaque Specimens

Plaques for D/B measurement, having dimensions of 127×127×1.5 mm are prepared according to internal method MA 17283; plaques for haze measurement, 1 mm thick, are prepared by injection moulding according to internal method MA 17335 with injection time of 1 second, temperature of 230° C., mould temperature of 40° C., description of all the said methods being available upon request.

Method MA 17283

The injection press is a Negri Bossi™ type (NB 90) with a clamping force of 90 tons.

The mould is a rectangular plaque (127×127×1.5 mm).

The main process parameters are reported below:

Back pressure (bar): 20
Injection time (s): 3
Maximum Injection pressure (MPa): 14
Hydraulic injection pressure (MPa): 6-3
First holding hydraulic pressure (MPa): 4±2
First holding time (s): 3
Second holding hydraulic pressure (MPa): 3±2
Second holding time (s): 7
Cooling time (s): 20
Mould temperature (° C.): 60
The melt temperature is between 220 and 280° C.

Method MA 17335

The injection press is a Battenfeld™ type BA 500CD with a clamping force of 50 tons. The insert mould leads to the moulding of two plaques (55×60×1 or 1.5 mm each).

Haze on Plague

Determined according to internal method MA 17270, available upon request.

The plaques are conditioned for 12 to 48 hours at relative humidity of 50±5% and temperature of 23±1° C.

The apparatus used is a Hunter™ D25P-9 calorimeter. The measurement and computation principle are given in the norm ASTM-D1003.

The apparatus is calibrated without specimen, the calibration is checked with a haze standard. The haze measurement is carried out on five plaques.

Izod Impact Strength (Notched)

Determined according to ISO 180/1A.

COMPARATIVE EXAMPLE 1C

Example 1 is repeated except that the polymerisation is carried out in a series of three reactors. Into the first reactor a crystalline propylene-ethylene copolymer is produced feeding the monomers and hydrogen in proper molar ratios (component (A')). The copolymer thus produced is discharged into the second reactor where a propylene-ethylene copolymer is produced by feeding the monomers and hydrogen in proper molar ratios (component (A")).

The copolymer produced in the second reactor is discharged in a continuous flow and, after having being purged of unreacted monomers, is introduced in a continuous flow into the third gas phase reactor, together with quantitatively constant flows of hydrogen and ethylene and 1-butene monomers in the gas state. Component (B) is thus obtained.

Polymerisation conditions, molar ratios, composition and properties of the copolymers obtained are shown in table 2. The comparative composition shows a value of flexural modulus in the same range as the one of the compositions of the present invention, value which is obtained only thanks to a crystalline polymer moiety of the matrix having a low flowability.

In comparison with the comparative composition, the compositions according to the present invention have a comparable or even better stiffness and better impact resistance in terms of ductile/brittle transition temperature in spite of remarkably higher MFR values that improve workability as it generally affects stiffness and impact resistance.

TABLE 1

| | | Example and comparative example | | | |
|---|---|---|---|---|---|
| | | 1 | 2 | 3 | 1c |
| 1st Gas Phase Reactor-crystalline propylene-ethylene copolymer | | | | | |
| Temperature | ° C. | 80 | 80 | 80 | 80 |
| Pressure | MPa | — | — | — | 1.8 |
| $H_2/C_3^-$ | mol | — | — | — | 0.002 |
| $C_2^-/(C_2^- + C_3^-)$ | mol | — | — | — | 0.019 |
| MFR "L" | g/10' | 41 | 52 | 24.4 | 1.2 |
| Ethylene content in the copolymer | wt % | 2.1 | 2.0 | 2.4 | 2.6 |
| Xylene soluble fraction | wt % | 3.6 | — | 4.1 | — |
| Split | wt % | 66 | 68 | 69 | 39 |
| 2nd Gas Phase Reactor-crystalline propylene-ethylene copolymer | | | | | |
| Split | wt % | 0 | 0 | 0 | 39 |
| MFR "L" (total) | g/10' | — | — | — | 11.7 |
| Ethylene content in the copolymer | wt % | — | — | — | 2.6 |
| $H_2/C_3^-$ | mol | — | — | — | 0.419 |
| Xylene-soluble fraction (total) | wt % | — | — | — | 96.5 |
| 2nd/3rd Gas Phase Reactor-ethylene-butene-1 copolymer rubber | | | | | |
| Temperature | ° C. | 75 | 75 | 70 | 70 |
| Pressure | MPa | — | — | — | 1.6 |
| $H_2/C_2^-$ | mol | — | — | — | 0.466 |
| $C_4^-/(C_4^- + C_2^-)$ | mol | 0.55 | 0.55 | 0.51 | 0.35 |
| Split | wt % | 34 | 32 | 31 | 22 |
| Butene-1 in the rubber | wt % | 27 | 24 | 25.8 | 23.6 |
| Xylene soluble fraction | wt % | 65 | 60 | 64 | — |

Notes to the table.
Split = weight fraction of polymer produced in the specified reactor;
$C_2^-$ = ethylene;
$C_4^-$ = butene;
$H_2/C_2^-$ = molar ratio of fed hydrogen to fed ethylene;
$C_2^-/(C_2^- + C_3^-)$ = molar ratio of fed ethylene to fed ethylene plus fed propylene;
$C_4^-/(C_4^- + C_2^-)$ = molar ratio of fed butene to fed butene plus fed ethylene.

TABLE 2

| | | Example and comparative example | | | |
|---|---|---|---|---|---|
| | | 1 | 2 | 3 | 1c |
| MFR "L" | g/10' | 32.5 | 28.2 | 19.4 | 9.4 |
| Xylene-soluble fraction | wt % | 24.6 | — | 22.6 | 13.6 |
| I.V. of xylene-soluble fraction | dl/g | 1.05 | — | 1.09 | 1.29 |
| Ethylene content | wt % | 26.0 | 25.7 | 25.4 | 18.4 |
| Butene-1 content | wt % | 9.1 | 7.7 | 8.0 | 5.2 |
| Flexural modulus | MPa | 671 | 757 | 760 | 1015 |
| D/B transition temperature | ° C. | −53 | −49 | −50 | −22 |
| Izod impact resistance at 23° C. | kJ/m² | — | — | 37.9 | 190[1] |
| Haze, 1 mm plaque | % | 35 | 39.5 | 23.7 | 13.3 |

[1] Expressed in J/m;
190 J/m corresponds to about 15.1 kJ/m².

The invention claimed is:

1. Polyolefin compositions comprising (percent by weight):
   1) 55-80% of a crystalline propylene homopolymer or copolymer containing up to 15% of at least one of ethylene and $C_4$-$C_{10}$ α-olefin(s) and having a MFR value (230° C., 2.16 kg) of at least 15 g/10 min; and
   2) 20-45% of a copolymer of ethylene with at least one of $C_4$-$C_{10}$ α-olefin(s) containing from 10 to 40% of said $C_4$-$C_{10}$ α-olefin(s);
   said compositions having MFR (230° C., 2.16 kg) values of at least 15 g/10 min, a total content of ethylene of 20% or more, a total content of $C_4$-$C_{10}$ α-olefin(s) of 4.5% or more, a ratio of the total content of ethylene to the total content of $C_4$-$C_{10}$ α-olefin(s) of 2.3 or more, and an intrinsic viscosity value of a fraction soluble in xylene at room temperature of at most 1.7 dl/g.

2. The polyolefin compositions according to claim 1 comprising (percent by weight):
   1) 55-75% of a crystalline propylene homopolymer or copolymer containing up to 15% of at least one of ethylene and $C_4$-$C_{10}$ α-olefin(s) and having a MFR from 15 to 80 g/10 min; and 2) 25-45% of a copolymer of ethylene with at least one of $C_4$-$C_{10}$ α-olefin(s) containing from 20 to 40% of said $C_4$-$C_{10}$ α-olefin(s);

said compositions having MFR (230° C., 2.16 kg) values at least 15 g/10 min, a total content of ethylene of 20% or more, a total content of $C_4$-$C_{10}$ α-olefin(s) of 6% or more, a ratio of the total content of ethylene to the total content of $C_4$-$C_{10}$ α-olefin(s) of 2.3 or more, a total fraction soluble in xylene at room temperature of 18 wt % or higher, and an intrinsic viscosity value of the fraction soluble in xylene at room temperature of at most 1.7 dl/g.

3. The polyolefin compositions of claim 1, having MFR values of at least 30 g/10 min.

4. The polyolefin compositions of claim 1, wherein the intrinsic viscosity of the fraction soluble in xylene at room temperature is in the range from 0.8 to 1.5 dl/g.

5. The polyolefin compositions of claim 1, wherein the fraction soluble in xylene at room temperature is higher than 20%.

6. The polyolefin compositions of claim 1, having a ductile/brittle transition temperature of at most −35° C.

7. A process for producing polyolefin compositions, which comprise:
1) 55-80% of a crystalline propylene homopolymer or copolymer containing up to 15% of at least one of ethylene and $C_4$-$C_{10}$ α-olefin(s) and having a MFR value (230° C., 2.16 kg) of at least 15 g/10 min; and
2) 20-45% of a copolymer of ethylene with at least one of $C_4$-$C_{10}$ α-olefin(s) containing from 10 to 40% of said $C_4$-$C_{10}$ α-olefin(s);
said compositions having MFR (230° C., 2.16 kg) values at least 15 g/10 min, a total content of ethylene of 20% or more a total content of $C_4$-$C_{10}$ α-olefin(s) of 4.5% or more, a ratio of the total content of ethylene to the total content of $C_4$-$C_{10}$ α-olefin(s) of 2.3 or more, and an intrinsic viscosity value of a fraction soluble in xylene at room temperature of at most 1.7 dl/g, the process being carried out in at least two sequential steps, wherein in at least one polymerization step the relevant monomer(s) are polymenzed to form component 1) and in the other step the relevant monomers are polymerized to form component 2), operating in each step, except the first step, in the presence of the polymer formed and the catalyst used in the preceding step.

8. The process of claim 7, wherein the polymerization catalyst is a stereospecific Ziegler-Natta catalyst comprising, as catalyst-forming components, a solid component comprising a titanium compound having at least one titanium-halogen bond and an electron-donor compound, both supported on a magnesium halide in active form, and an organoaluminum compound.

9. The process of claim 7, wherein both components 1) and 2) are prepared in gas phase.

10. Injection moulded articles comprising polyolefin compositions, which comprise:
1) 55-80% of a crystalline propylene homopolymer or copolymer containing up to 15% at least one of ethylene and $C_4$-$C_{10}$ α-olefin(s) and having a MFR value (230° C., 2.16 kg) of at least 15 g/10 min; and
2) 20-45% of a copolymer of ethylene with at least one of $C_4$-$C_{10}$ α-olefin(s) containing from 10 to 40% of said $C_4$-$C_{10}$ α-olefin(s);
said compositions having MFR (230° C., 2.16 kg) values at least 15 g/10 min, a total content of ethylene of 20% or more, a total content of $C_4$-$C_{10}$ α-olefin(s) of 4.5% or more, a ratio of the total content of ethylene to the total content of $C_4$-$C_{10}$ α-olefin(s) of 2.3 or more, and an intrinsic viscosity value of a fraction soluble in xylene at room temperature of at most 1.7 dl/g.

11. The polyolefin compositions according to claim 2 comprising (percent by weight):
1) 55-70% of a crystalline propylene homopolymer or copolymer containing up to 15% of at least one of ethylene and $C_4$-$C_{10}$ α-olefin(s) and having a MFR value of from 15 to 80 g/10 min; and
2) 30-45% of a copolymer of ethylene with at least one of $C_4$-$C_{10}$ α-olefin(s) containing from 20 to 40% of said $C_4$-$C_{10}$ α-olefin(s);
said compositions having values of MFR (230° C., 2.16 kg) equal to or higher than 15 g/10 min, a total content of ethylene of 20% or more, a total content of $C_4$-$C_{10}$ α-olefin(s) of 6% or more, a ratio of the total content of ethylene to the total content of $C_4$-$C_{10}$ α-olefin(s) of 2.3 or more, a total fraction soluble in xylene at room temperature of 18 wt % or higher, and an intrinsic viscosity value of a fraction soluble in xylene at room temperature of at most 1.7 dl/g.

* * * * *